(12) United States Patent
Chilukuri et al.

(10) Patent No.: US 11,718,409 B2
(45) Date of Patent: Aug. 8, 2023

(54) NACELLE WITH INDEPENDENT OPENING THRUST REVERSER SECTION

(71) Applicant: Rohr, Inc., Chula Vista, CA (US)

(72) Inventors: Radhakrishna Chilukuri, San Diego, CA (US); Jihad Ramlaoui, Chula Vista, CA (US); Timothy Gormley, Bonita, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 17/224,787

(22) Filed: Apr. 7, 2021

(65) Prior Publication Data

US 2021/0310440 A1 Oct. 7, 2021

Related U.S. Application Data

(60) Provisional application No. 63/006,421, filed on Apr. 7, 2020.

(51) Int. Cl.
*B64D 29/06* (2006.01)
*B64D 29/08* (2006.01)
*F02K 1/72* (2006.01)

(52) U.S. Cl.
CPC ............ *B64D 29/08* (2013.01); *B64D 29/06* (2013.01); *F02K 1/72* (2013.01); *F05D 2220/323* (2013.01)

(58) Field of Classification Search
CPC ............ F02K 1/72; B64D 29/08; B64D 29/06
See application file for complete search history.

(56) References Cited

U.S. PATENT DOCUMENTS

| | | | |
|---|---|---|---|
| 5,157,915 A | 10/1992 | Bart | |
| 5,203,525 A * | 4/1993 | Remlaoui | E05D 3/06 244/129.4 |
| 6,227,485 B1 * | 5/2001 | Porte | B64D 29/08 244/54 |
| 7,484,354 B2 | 2/2009 | Stretton | |
| 9,126,691 B2 | 9/2015 | Cloft | |
| 10,144,500 B2 | 12/2018 | Pautis | |
| 2003/0102405 A1 * | 6/2003 | McEvoy | B64D 29/08 244/54 |
| 2006/0145001 A1 * | 7/2006 | Smith | B64D 29/06 244/110 B |
| 2013/0220435 A1 * | 8/2013 | James | B64D 29/08 137/15.1 |

(Continued)

OTHER PUBLICATIONS

EP search report for EP21167264.7 dated Sep. 13, 2021.

*Primary Examiner* — Andrew H Nguyen
(74) *Attorney, Agent, or Firm* — Getz Balich LLC

(57) ABSTRACT

An assembly is provided for an aircraft propulsion system. This assembly includes a fixed structure and a nacelle. The nacelle includes a first fan cowl and a first thrust reverser section adjacent the first fan cowl. The first fan cowl is movably attached to and arranged on a first side of the fixed structure. The first fan cowl is configured to move between a first fan cowl closed position and a first fan cowl second position. The first thrust reverser section is movably attached to and arranged on the first side of the fixed structure. The first thrust reverser section is configured to move between a first thrust reverser section closed position and a first thrust reverser section open position when the first fan cowl is in the first fan cowl closed position.

14 Claims, 14 Drawing Sheets

(56) References Cited

U.S. PATENT DOCUMENTS

| | | | |
|---|---|---|---|
| 2014/0116026 A1* | 5/2014 | Todorovic | F02K 1/72 60/226.2 |
| 2014/0216005 A1* | 8/2014 | Sidelkovskiy | F02K 1/72 60/226.2 |
| 2014/0217195 A1* | 8/2014 | Aten | F02K 1/72 239/265.19 |
| 2015/0110613 A1* | 4/2015 | Aten | B64C 7/02 415/182.1 |
| 2016/0031563 A1* | 2/2016 | Pautis | B64D 29/06 60/770 |
| 2017/0298869 A1* | 10/2017 | Crawford | F02K 1/72 |
| 2018/0156131 A1 | 6/2018 | Olson | |

* cited by examiner

NACELLE WITH INDEPENDENT OPENING THRUST REVERSER SECTION

This application claims priority to U.S. Patent Appln. No. 63/006,421 filed Apr. 7, 2020, which is hereby incorporated herein by reference in its entirety.

BACKGROUND

1. Technical Field

This disclosure relates generally to an aircraft propulsion system and, more particularly, to a nacelle for the aircraft propulsion system.

2. Background Information

A modern aircraft propulsion system includes a gas turbine engine and a nacelle for housing the gas turbine engine. The nacelle typically includes first and second side fan cowls and first and second side thrust reverser halves. An aft edge portion of the first side fan cowl axially overlaps a forward edge portion of the first side thrust reverser half. Thus, in order to open the first side thrust reverser half, the first side fan cowl must first be opened. Similarly, an aft edge portion of the second side fan cowl axially overlaps a forward edge portion of the second side thrust reverser half. Thus, in order to open the second side thrust reverser half, the second side fan cowl must first be opened. This arrangement requires the first and the second side fan cowls to be configured for frequent opening such that the first and the second side thrust reverser halves may be opened to facilitate gas turbine engine inspection and/or maintenance. The first and the second side fan cowls are therefore typically configured with opening systems, devices to maintain those cowls in their open positions, etc. The first and the second side fan cowls may also be configured with extra stiffeners and other supports such that those cowls may resist, for example, wind loading or edge droop due to gravity when the cowls are opened while the aircraft is on a tarmac. As a result, the weight, complexity and cost of the first and the second side fan cowls increases. There is a need in the art therefore for an improved system for providing access to components beneath fan cowl(s) and/or thrust reverser halve(s).

SUMMARY OF THE DISCLOSURE

According to an aspect of the present disclosure, an assembly is provided for an aircraft propulsion system. This assembly includes a fixed structure and a nacelle. The nacelle includes a first fan cowl and a first thrust reverser section adjacent the first fan cowl. The first fan cowl is movably attached to and arranged on a first side of the fixed structure. The first fan cowl is configured to move between a first fan cowl closed position and a first fan cowl second position. The first thrust reverser section is movably attached to and arranged on the first side of the fixed structure. The first thrust reverser section is configured to move between a first thrust reverser section closed position and a first thrust reverser section open position when the first fan cowl is in the first fan cowl closed position.

According to another aspect of the present disclosure, another assembly is provided for an aircraft propulsion system. This assembly includes a fixed structure, a first fan cowl and a second fan cowl. The first fan cowl is movably attached to and arranged on a first side of the fixed structure. The first fan cowl is configured to move between a first fan cowl closed position and a first fan cowl second position. The first fan cowl has a first axial length at an edge adjacent the fixed structure. The second fan cowl is movably attached to and arranged on a second side of the fixed structure. The second fan cowl is configured to move between a second fan cowl closed position and a second fan cowl open position. The second fan cowl has a second axial length at an edge adjacent the fixed structure. The second axial length is different than the first axial length.

According to still another aspect of the present disclosure, still another assembly is provided for an aircraft propulsion system. This assembly includes a fixed structure, a first fan cowl, a second fan cowl, a first thrust reverser section and a second thrust reverser section. The first fan cowl is movably attached to and arranged on a first side of the fixed structure. The second fan cowl is movably attached to and arranged on a second side of the fixed structure. The first thrust reverser section is movably attached to and arranged on the first side of the fixed structure. The first thrust reverser section includes a fairing and a translating first thrust reverser sleeve. The fairing extends axially between and is abutted axially next to the first fan cowl and the translating first thrust reverser sleeve. The second thrust reverser section is movably attached to and arranged on the second side of the fixed structure. The second thrust reverser section includes a translating second thrust reverser sleeve abutted axially next to the second fan cowl.

The first thrust reverser section may be configured to move from a first thrust reverser section closed position to a first thrust reverser section open position when the first fan cowl is closed.

The first thrust reverser section may be configured to pivot outward from the first thrust reverser section closed position to the first thrust reverser section open position when the first fan cowl is in the first fan cowl closed position.

The first thrust reverser section may include a fairing and a first thrust reverser sleeve. The fairing may be located axially between and circumferentially aligned with the first fan cowl and the first thrust reverser sleeve. The first fan cowl, the fairing and the first thrust reverser sleeve may each form a respective portion of an exterior flow surface of the nacelle.

The first thrust reverser sleeve may be configured to translate axially from a stowed position to a deployed position to open a thrust reverser passage axially between the first thrust reverser sleeve and the fairing.

The assembly may also include a bulkhead including a land. The first fan cowl may axially overlap and may be radially abutted against the land when the first fan cowl is in the first fan cowl closed position. The fairing may axially overlap and may be radially abutted against the land when the first thrust reverser section is in the first thrust reverser section closed position.

The assembly may also include a fan case. The bulkhead may be connected to and may project out from the fan case.

The nacelle may also include a second fan cowl and a second thrust reverser section. The second fan cowl may be movably attached to and arranged on a second side of the fixed structure. The second fan cowl may be configured to move between a second fan cowl closed position and a second fan cowl open position. The second thrust reverser section may be movably attached to and arranged on the second side of the fixed structure. The second thrust reverser section may be configured to move between a second thrust reverser section closed position and a second thrust reverser section open position when the second fan cowl is in the second fan cowl open position.

The second fan cowl may axially overlap the second thrust reverser section.

The second fan cowl may prevent the second thrust reverser section from being moved to the second thrust reverser section open position when the second fan cowl is in the second fan cowl closed position.

The assembly may include a latch configured to secure the first fan cowl and the second fan cowl together when the first fan cowl is in the first fan cowl closed position and when the second fan cowl is in the second fan cowl closed position.

The first fan cowl may have a first axial length at an edge of the first fan cowl adjacent the fixed structure. The second fan cowl may have a second axial length at an edge of the second fan cowl adjacent the fixed structure. The first axial length may be less than the second axial length.

The assembly may also include a first attachment with a first attachment configuration and a second attachment with a second attachment configuration that is different than the first attachment configuration. The first attachment may moveably attach the first fan cowl to the fixed structure. The second attachment may pivotally attach the second fan cowl to the fixed structure.

The second thrust reverser section may include a second thrust reverser sleeve that is arranged axially adjacent the second fan cowl.

The second fan cowl may be configured with a substantially uninterrupted exterior surface.

The first fan cowl may be configured with an access port and/or a vent.

The assembly may also include a first thrust reverser section movably attached to and arranged on the first side of the fixed structure. The first thrust reverser section may be configured to move between a first thrust reverser section closed position and a first thrust reverser section open position when the first fan cowl is in the first fan cowl closed position.

The assembly may also include a translating first thrust reverser sleeve, a fixed fairing and a translating second thrust reverser sleeve. The fixed fairing may be axially between first fan cowl and the translating first thrust reverser sleeve. The translating second thrust reverser sleeve may be axially adjacent the second fan cowl.

The foregoing features and the operation of the invention will become more apparent in light of the following description and the accompanying drawings.

DETAILED DESCRIPTION

Figure 1:
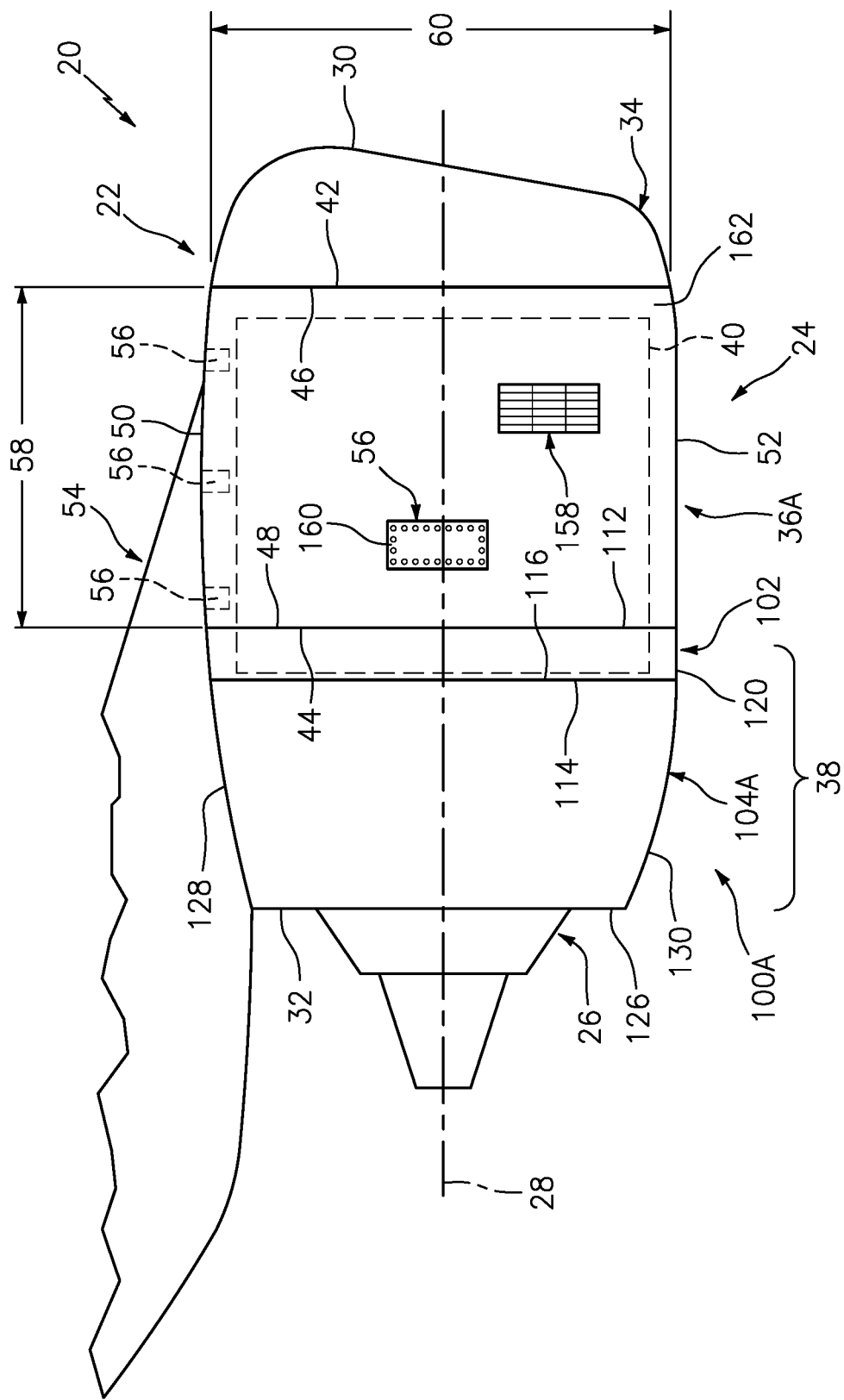
FIG. 1 is an illustration of a first side of an aircraft propulsion system.
Figure 2:
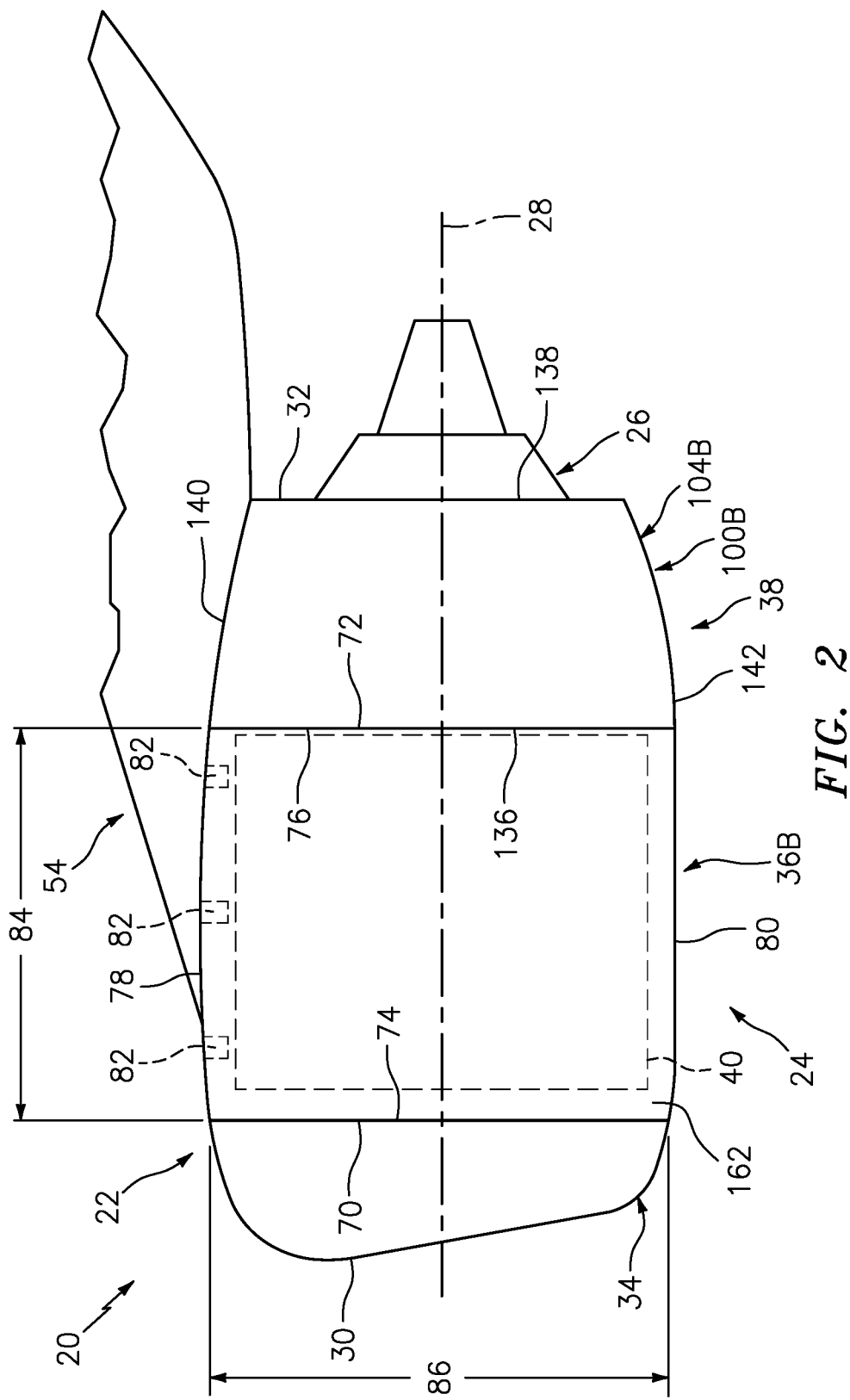
FIG. 2 is an illustration of a second side of the aircraft propulsion system.

FIGS. 1 and 2 illustrate an aircraft propulsion system 20 for an aircraft such as, but not limited to, a commercial airliner or cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. The nacelle 22 of FIGS. 1 and 2 includes a nacelle outer structure 24 and a nacelle inner structure 26, which inner structure 26 may sometimes be referred to as an inner fixed structure (IFS).

The nacelle outer structure 24 extends axially along an axial centerline 28 of the aircraft propulsion system 20 between a nacelle forward end 30 and a nacelle aft end 32. The nacelle outer structure 24 of FIGS. 1 and 2 includes a nacelle inlet structure 34, one or more fan cowls 36A and 36B and a nacelle aft structure 38, which aft structure 38 is configured as part of or includes a thrust reverser system.

The inlet structure 34 is disposed at the nacelle forward end 30. The inlet structure 34 is configured to direct a stream of air through an inlet opening at the nacelle forward end 30 and into a fan section of the gas turbine engine.

Referring to FIG. 1, the first fan cowl 36A is disposed axially between the inlet structure 34 and the aft structure 38 on a first side of the aircraft propulsion system 20. The first fan cowl 36A is axially aligned with a fan section of the gas turbine engine. The first fan cowl 36A is configured to provide an aerodynamic covering for a first side of a fan case 40; e.g., a fan blade containment case. Briefly, this fan case 40 circumscribes the fan section and partially forms a forward outer peripheral boundary of a flowpath through the propulsion system.

The first fan cowl 36A extends axially between a forward edge 42 and an aft edge 44. The forward edge 42 is axially abutted next to an aft end 46 of the inlet structure 34. The aft edge 44 is axially abutted next to a forward end 48 of the nacelle aft structure 38.

Figure 3A:
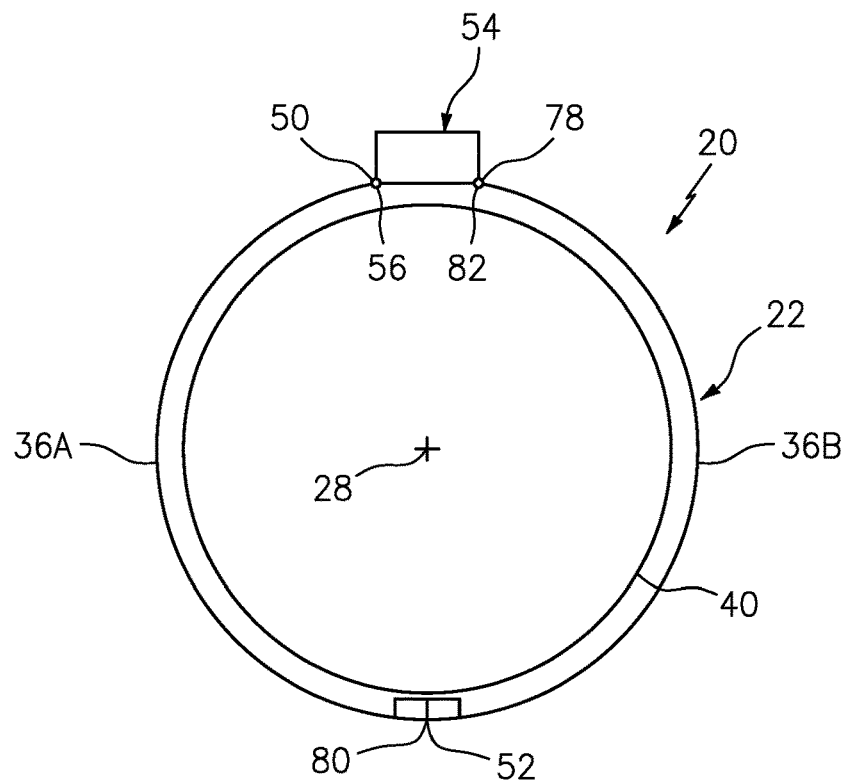
FIG. 3A is a schematic cross-sectional illustration of the aircraft propulsion system with its first and second fan cowls in closed positions.

The first fan cowl 36A extends circumferentially about the axial centerline 28 between a first (e.g., upper) edge 50 and a second (e.g., lower) edge 52, where the first edge 50 and the second edge 52 extend axially from the forward edge 42 to the aft edge 44. The first edge 50 is on and circumferentially abutted next to a first side of a fixed structure 54, which fixed structure 54 may be configured as or otherwise include a pylon that attaches the aircraft propulsion system 20 to another component of an aircraft; e.g., an aircraft wing. The second edge 52 is circumferentially abutted next to the second fan cowl 36B as shown in FIG. 3A.

Figure 3B:
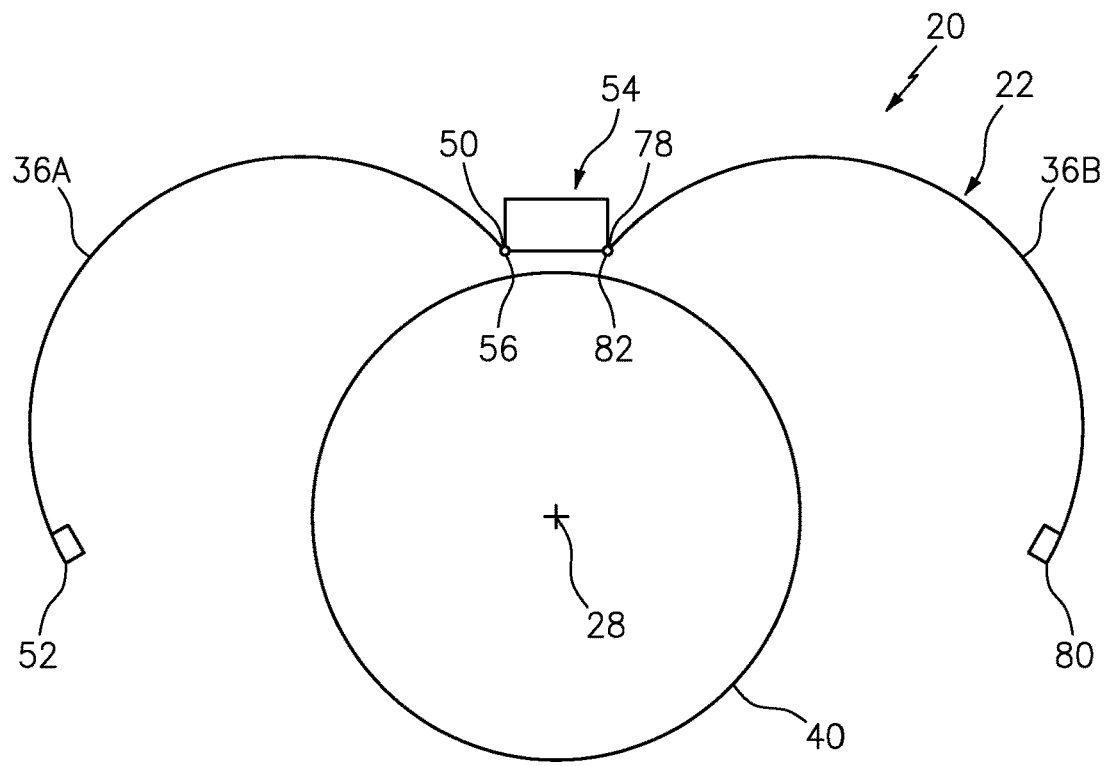
FIG. 3B is a schematic cross-sectional illustration of the aircraft propulsion system with its first and second fan cowls in open positions.

The first fan cowl 36A is movably (e.g., pivotally) attached to the fixed structure 54 at (e.g., on, adjacent or proximate) the first edge 50. The first fan cowl 36A of FIG. 1, for example, is configured with one or more moveable first attachments 56; e.g., low profile hinges. These first attachments 56 may pivotally attach the first fan cowl 36A to the fixed structure 54. The first fan cowl 36A is thereby configured to pivot or otherwise move outward from a first fan cowl closed position (see FIG. 3A) to a first fan cowl open position (see FIG. 3B) (or a removed position) to provide access to a portion of the gas turbine engine and/or gas turbine engine accessories located underneath the first fan cowl 36A.

The first fan cowl 36A has a first axial length 58 that extends axially along the centerline 28 at the first edge 50 between the forward edge 42 and the aft edge 44. The first fan cowl 36A also has a first circumferential length 60 that extends circumferentially about the centerline 28 at the forward edge 42 between the first edge 50 and the second edge 52.

Figure 4:
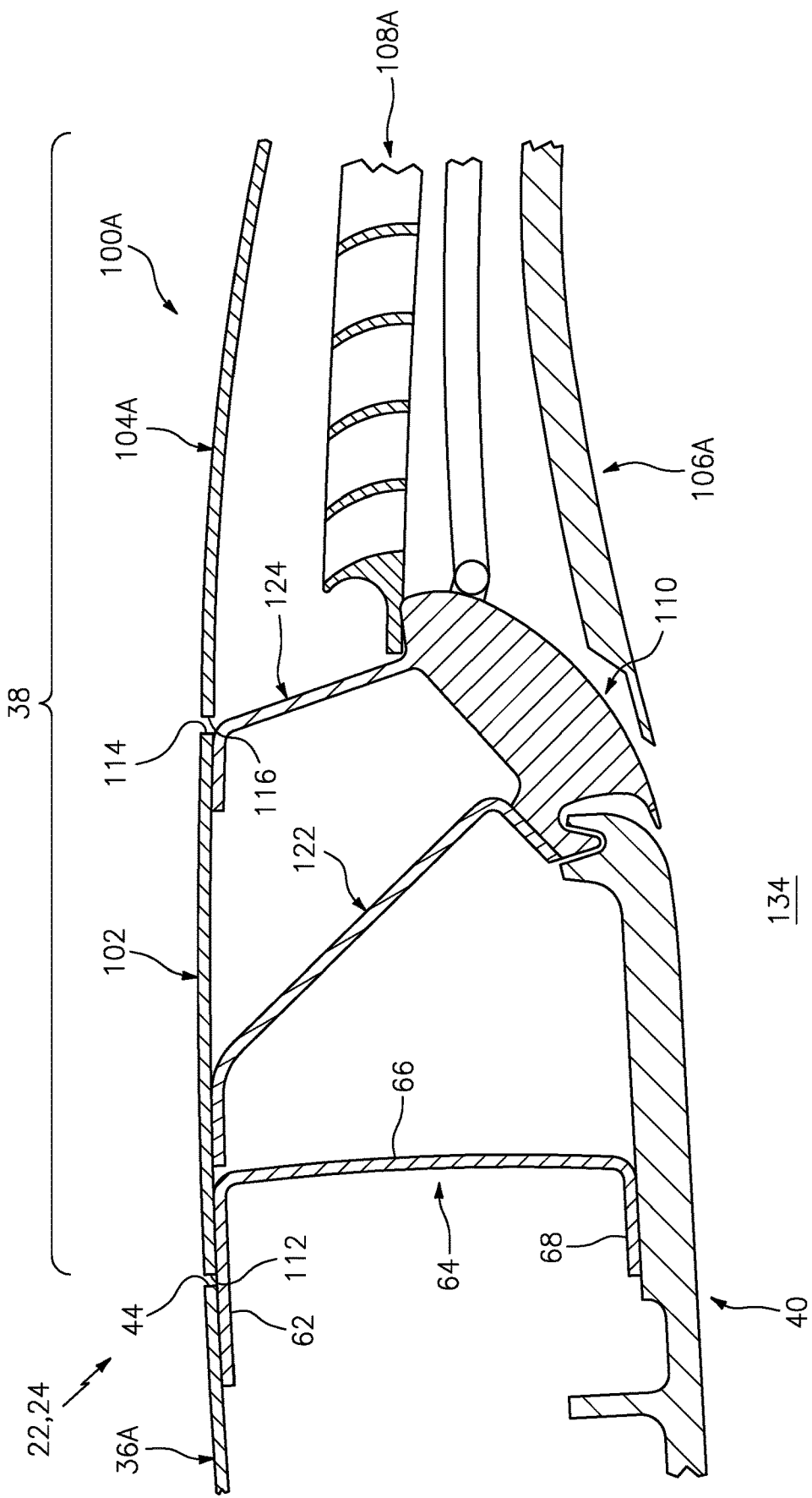
FIG. 4 is a side sectional illustration of an interface between the first fan cowl and a first thrust reverser section on the first side of the aircraft propulsion system.

Referring to FIG. 4, when the first fan cowl 36A is in the first fan cowl closed position, an aft portion of the first fan cowl 36A that extends along the aft edge 44 is radially abutted against a first land 62 (e.g., an outer flange) of a first bulkhead 64; e.g., a forward bulkhead. More particularly, the first fan cowl aft portion of FIG. 4 is radially outboard of, axially overlaps and/or rests against the first land 62. While the first fan cowl 36A may rest against the first land 62, the first fan cowl 36A is not fixedly attached (e.g., mechanically fastened or bonded) to the first land 62. The first fan cowl 36A may thereby pull away from the first land 62 when, for example, the first fan cowl 36A is moved from the first fan cowl close position (see FIG. 3A) to the first fan cowl open position (see FIG. 3B).

The first bulkhead 64 includes a first web 66, the first land 62 and a first mount 68 (e.g., an inner flange). The first web 66 projects in a generally radially outward direction from the first mount 68 to the first land 62. The first land 62 projects out from the first web 66 in, for example, a generally axially forward (or alternatively aft) direction. The first mount 68 is fixedly attached (e.g., mechanically fastened) to the fan case 40 near an aft end of the fan case 40.

Referring to FIG. 2, the second fan cowl 36B is disposed axially between the inlet structure 34 and the aft structure 38 on a second side of the aircraft propulsion system 20. The second fan cowl 36B is axially aligned with the fan section of the gas turbine engine. The second fan cowl 36B is configured to provide an aerodynamic covering for a second side of the fan case 40.

The second fan cowl 36B extends axially between a forward edge 70 and an aft edge 72. The forward edge 70 is axially abutted next to an aft end 74 of the inlet structure 34. The aft edge 72 is axially abutted next to a forward end 76 of the nacelle aft structure 38.

The second fan cowl 36B extends circumferentially about the axial centerline 28 between a first (e.g., upper) edge 78 and a second (e.g., lower) edge 80, where the first edge 78 and the second edge 80 extend axially from the forward edge 70 to the aft edge 72. The first edge 78 is on and circumferentially abutted next to a second side of the fixed structure 54. The second edge 80 is circumferentially abutted next to the first fan cowl 36A as shown in FIG. 3A.

The second fan cowl 36B is movably (e.g., pivotally) attached to the fixed structure 54 at the first edge 78. The second fan cowl 36B of FIG. 2, for example, is configured with one or more moveable second attachments 82; e.g., gooseneck hinges. These second attachments 82 pivotally attach the second fan cowl 36B to the fixed structure 54. The second fan cowl 36B is thereby configured to pivot outward from a second fan cowl closed position (see FIG. 3A) to a second fan cowl open position (see FIG. 3B) to provide access to a portion of the gas turbine engine and/or gas turbine engine accessories located underneath the second fan cowl 36B.

The second fan cowl 36B has a second axial length 84 that extends axially along the centerline 28 at the first edge 78 between the forward edge 70 and the aft edge 72. The second axial length 84 of FIG. 2 is greater than the first axial length 58 of FIG. 1. The second fan cowl 36B also has a second circumferential length 86 that extends circumferentially about the centerline 28 at the forward edge 70 between the first edge 78 and the second edge 80. The second circumferential length 86 of FIG. 2 may be at least approximately equal to (e.g., within +/−2%) or exactly equal to the first circumferential length 60 of FIG. 1. Of course, in other embodiments the second circumferential length 86 may be different than the first circumferential length 60 where, for example, the nacelle outer structure 24 has an asymmetric cross-sectional shape.

Figure 5:
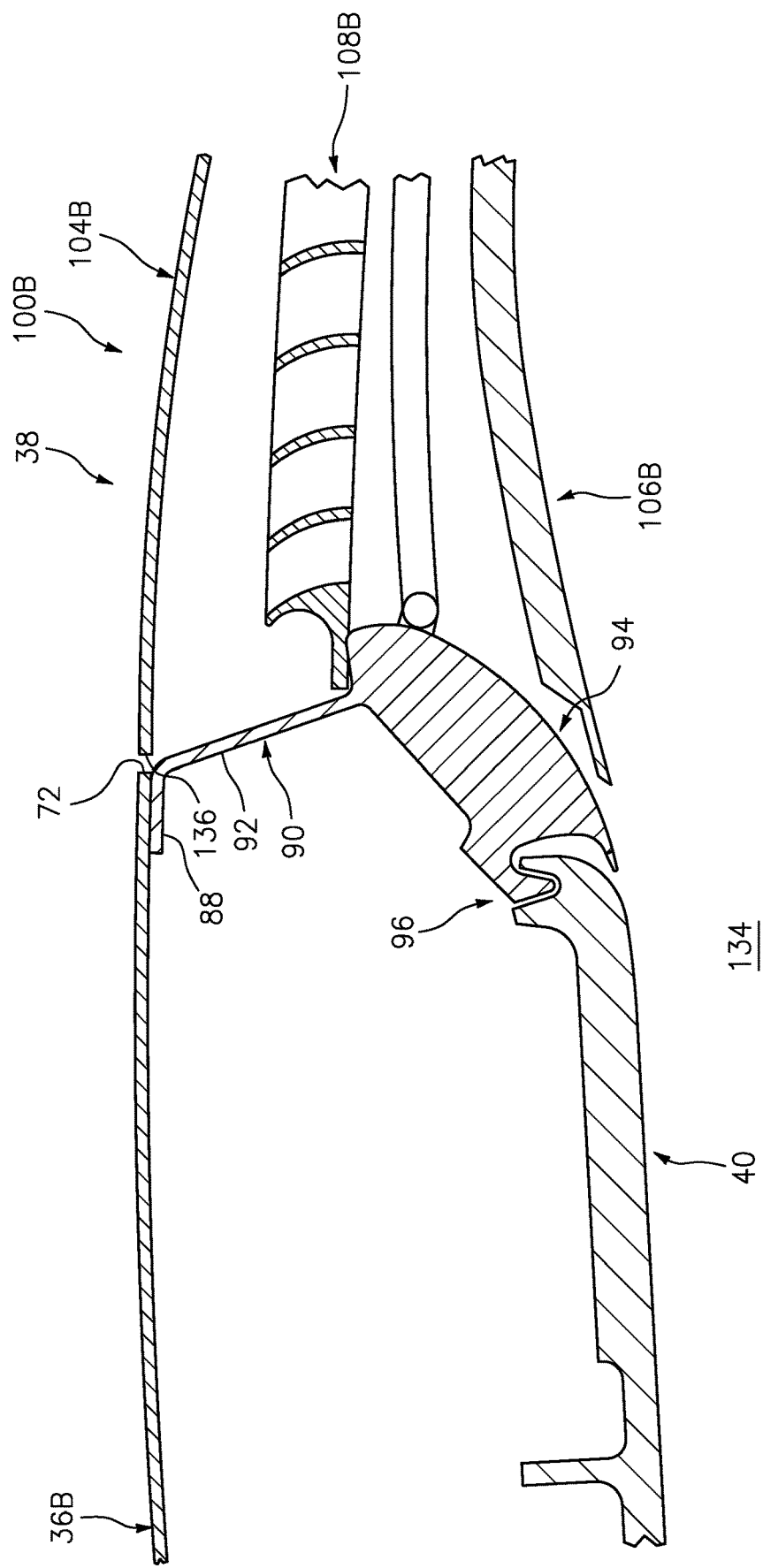
FIG. 5 is a side sectional illustration of an interface between the second fan cowl and a second thrust reverser section on the second side of the aircraft propulsion system.

Referring to FIG. 5, when the second fan cowl 36B is in the second fan cowl closed position, an aft portion of the second fan cowl 36B that extends along the aft edge 72 is radially abutted against a second land 88 (e.g., an outer flange) of a second bulkhead 90; e.g., an aft bulkhead. More particularly, the second fan cowl aft portion of FIG. 5 is radially outboard of, axially overlaps and/or rests against the second land 88. While the second fan cowl 36B may rest against the second land 88, the second fan cowl 36B is not fixedly attached (e.g., mechanically fastened or bonded) to the second land 88. The second fan cowl 36B may thereby pull away from the second land 88 when, for example, the second fan cowl 36B is moved from the second fan cowl close position (see FIG. 3A) to the second fan cowl open position (see FIG. 3B).

The second bulkhead 90 includes a second web 92 and the second land 88. The second web 92 projects in a generally radially outward direction from a second ramp fairing structure 94 to the second land 88, which second ramp fairing structure 94 is removably attached to the fan case 40 by, for example, a V-groove interface 96. The second land 88 projects out from the second web 92 in, for example, a generally axially forward (or alternatively aft) direction.

Figure 6:
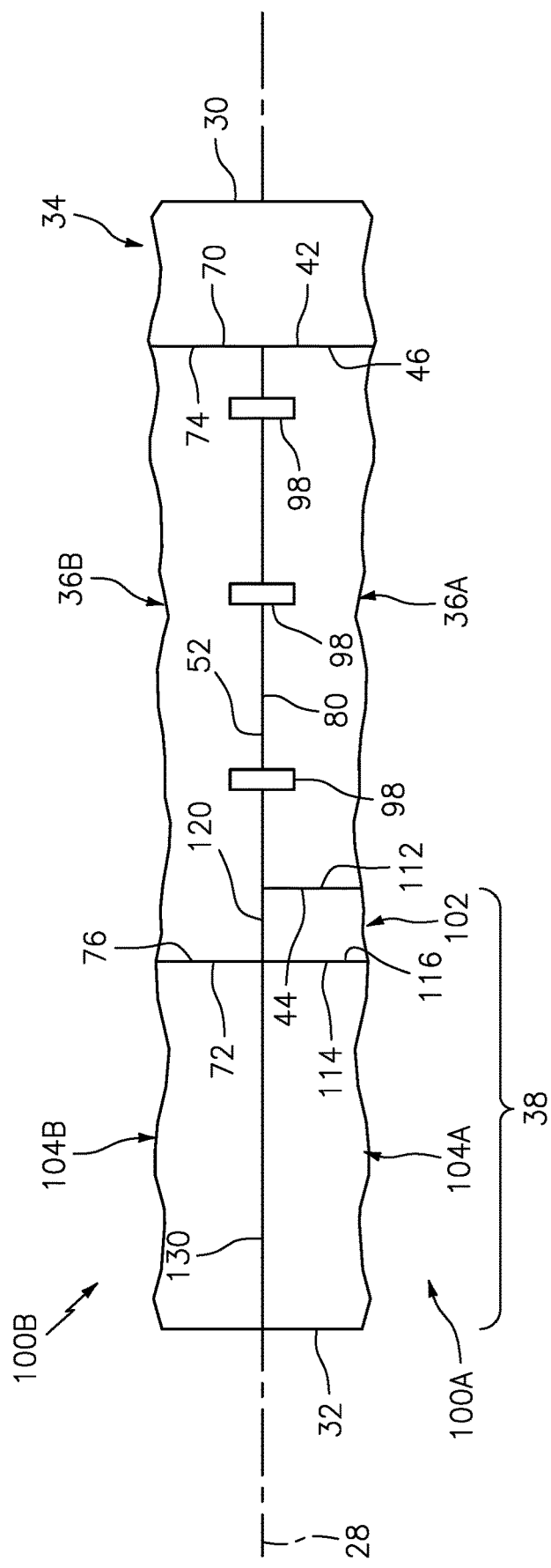
FIG. 6 is an illustration of an interface between opposing side sections of a nacelle.

Referring to FIG. 6, the second fan cowl 36B may be secured to the first fan cowl 36A when those cowls 36A and 36B (generally referred to as "36") are in their closed positions by a latch system. The latch system of FIG. 6 includes one or more latches 98 arranged axially along the centerline 28 and the second edges 52 and 80. These latches 98 are configured to (e.g., directly) tie and secure the first fan cowl 36A and the second fan cowl 36B together.

The aft structure 38 of FIGS. 1 and 2 includes an outer portion of a first thrust reverser section 100A (e.g., half) and an outer portion of a second thrust reverser section 100B (e.g., half). The first thrust reverser section outer portion of FIG. 1 includes a fixed fairing 102, a translating first thrust reverser sleeve 104A and one or more components of the thrust reverser (e.g., see FIG. 4) such as, but not limited to, one or more first blocker doors 106A, a first cascade 108A and a first ramp fairing structure 110.

The fairing 102 of FIG. 1 is arranged axially between and circumferentially aligned with the first fan cowl 36A and the first thrust reverser sleeve 104A. More particularly, the fairing 102 extends axially along the centerline 28 between a forward edge 112 and an aft edge 114. The forward edge 112 is axially abutted next to the aft edge 44 of the first fan cowl 36A. The aft edge 114 is axially abutted next to a forward edge 116 of the first thrust reverser sleeve 104A.

The fairing 102 extends circumferentially about the axial centerline 28 between a first (e.g., upper) edge 118 and a second (e.g., lower) edge 120, where the first edge 118 and the second edge 120 extend axially from the forward edge 112 to the aft edge 114. The first edge 118 is at and circumferentially abutted next to the first side of the fixed structure 54. The second edge 120 is circumferentially abutted next to the second fan cowl 36B and its second edge 80 as shown in FIG. 6.

Referring to FIG. 4, when the first thrust reverser section 100A is in its first thrust reverser section closed position, a forward portion of the fairing 102 that extends along the forward edge 112 is radially abutted against the first land 62. More particularly, the fairing forward portion of FIG. 4 is radially outboard of, axially overlaps and/or rests against the first land 62. While the fairing 102 may rest against the first land 62, the fairing 102 is not fixedly attached (e.g., mechanically fastened or bonded) to the first land 62. The fairing 102 may thereby pull away from the first land 62 when, for example, the first thrust reverser section 100A is moved (e.g., pivoted) from the first thrust reverser section close position (see FIG. 3A) to a first thrust reverser section open position (see FIG. 7) as described below.

The fairing 102 of FIG. 4 is fixedly connected to the first ramp fairing structure 110 by one or more support structures 122 and 124; e.g., segmented bulkheads.

The first thrust reverser sleeve 104A of FIG. 1 is arranged axially aft of the fairing 102. More particularly, the first thrust reverser sleeve 104A extends axially along the centerline 28 between the forward edge 116 and an aft edge 126. The forward edge 116 is axially abutted next to the aft edge 126 of the fairing 102. The aft edge 126 is at the nacelle aft end 32.

The first thrust reverser sleeve 104A extends circumferentially about the axial centerline 28 between a first (e.g., upper) edge 128 and a second (e.g., lower) edge 130, where the first edge 128 and the second edge 130 extend axially from the forward edge 116 to the aft edge 126. The first edge 128 is at and circumferentially abutted next to the first side of the fixed structure 54. The second edge 130 is circumferentially abutted next the second thrust reverser section 100B and its sleeve 104B as shown in FIG. 6.

Figure 8A:
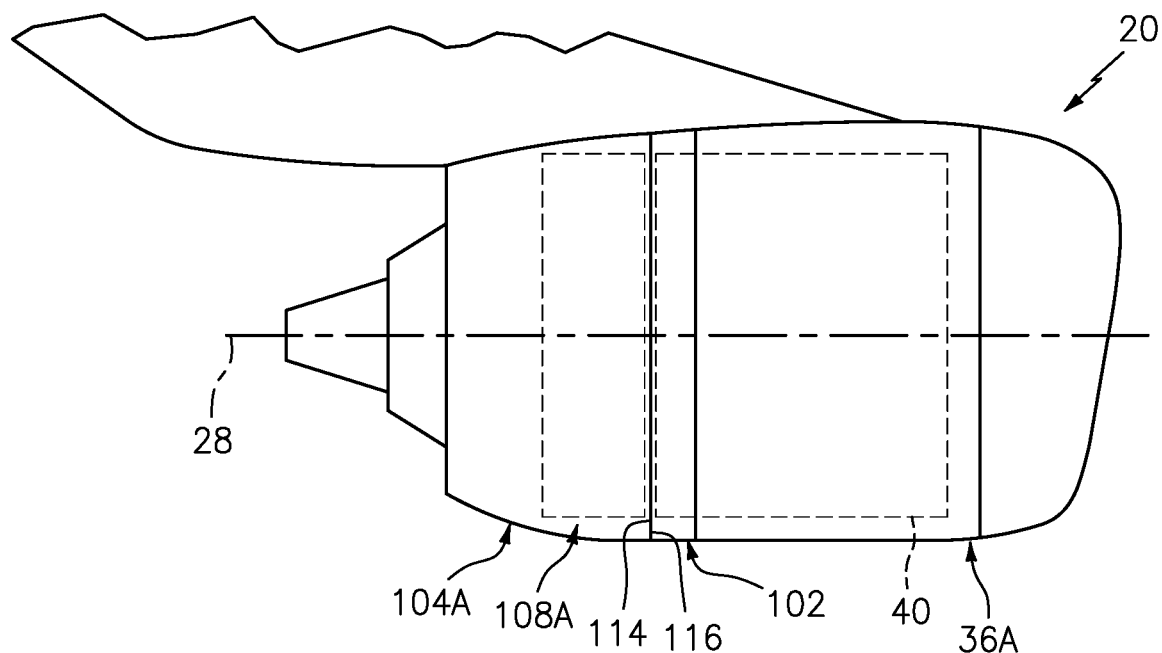
FIG. 8A is an illustration of the first side of the aircraft propulsion system with its translating first thrust reverser sleeve in a closed position.
Figure 8B:
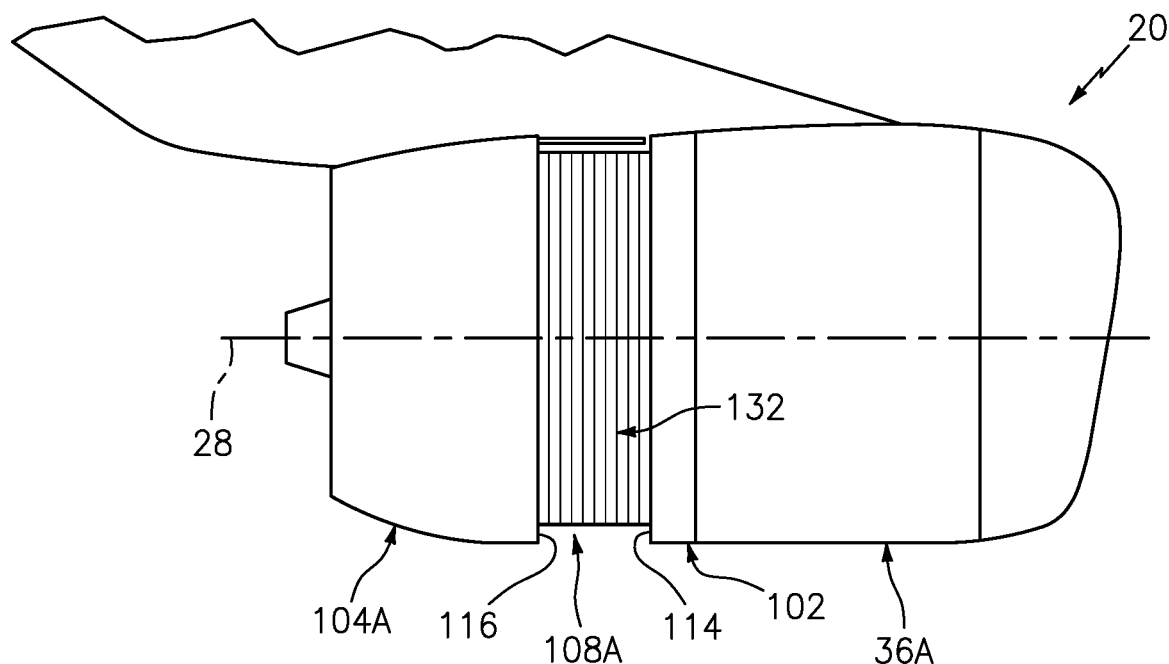
FIG. 8B is an illustration of the first side of the aircraft propulsion system with its translating first thrust reverser sleeve in an open position.

Referring to FIGS. 8A and 8B, the first thrust reverser sleeve 104A is configured to move (e.g., translate) between a first thrust reverser sleeve stowed position (see FIG. 8A) and a first thrust reverser sleeve deployed position (see FIG. 8B). In the first thrust reverser sleeve stowed position of FIG. 8A, the forward edge 116 of the first thrust reverser sleeve 104A is axially abutted with/next to the aft edge 114 of the fairing 102 as described above. In the first thrust reverser sleeve deployed position of FIG. 8B, the forward edge 116 of the first thrust reverser sleeve 104A is axially separated/spaced from the aft edge 114 of the fairing 102 by a gap. This enables the first thrust reverser sleeve 104A to uncover the first cascade 108A and a first passage 132 of the thrust reverser. By contrast, in the first thrust reverser sleeve stowed position, the first thrust reverser sleeve 104A covers the first cascade 108A and closes the first passage 132. Referring to FIG. 4, the first blocker doors 106A may also be deployed radially inward into a bypass flow path 134 as the first thrust reverser sleeve 104A moves from its stowed position to its deployed position.

The second thrust reverser section outer portion of FIG. 2 includes a translating second thrust reverser sleeve 104B and one or more components of the thrust reverser (e.g., see FIG. 5) such as, but not limited to, one or more second blocker doors 106B, a second cascade 108B and the second ramp fairing structure 94.

The second thrust reverser sleeve 104B of FIG. 2 is arranged axially aft of the second fan cowl 36B. More particularly, the second thrust reverser sleeve 104B extends axially along the centerline 28 between a forward edge 136 and an aft edge 138. The forward edge 136 is axially abutted next to the aft edge 72 of the second fan cowl 36B. The aft edge 138 is at the nacelle aft end 32.

The second thrust reverser sleeve 104B extends circumferentially about the axial centerline 28 between a first (e.g., upper) edge 140 and a second (e.g., lower) edge 142, where the first edge 140 and the second edge 142 extend axially from the forward edge 136 to the aft edge 138. The first edge 140 is at and circumferentially abutted next to the first side of the fixed structure 54. The second edge 142 is circumferentially abutted next the first thrust reverser section 100A and its sleeve 104A as shown in FIG. 6.

Figure 9A:
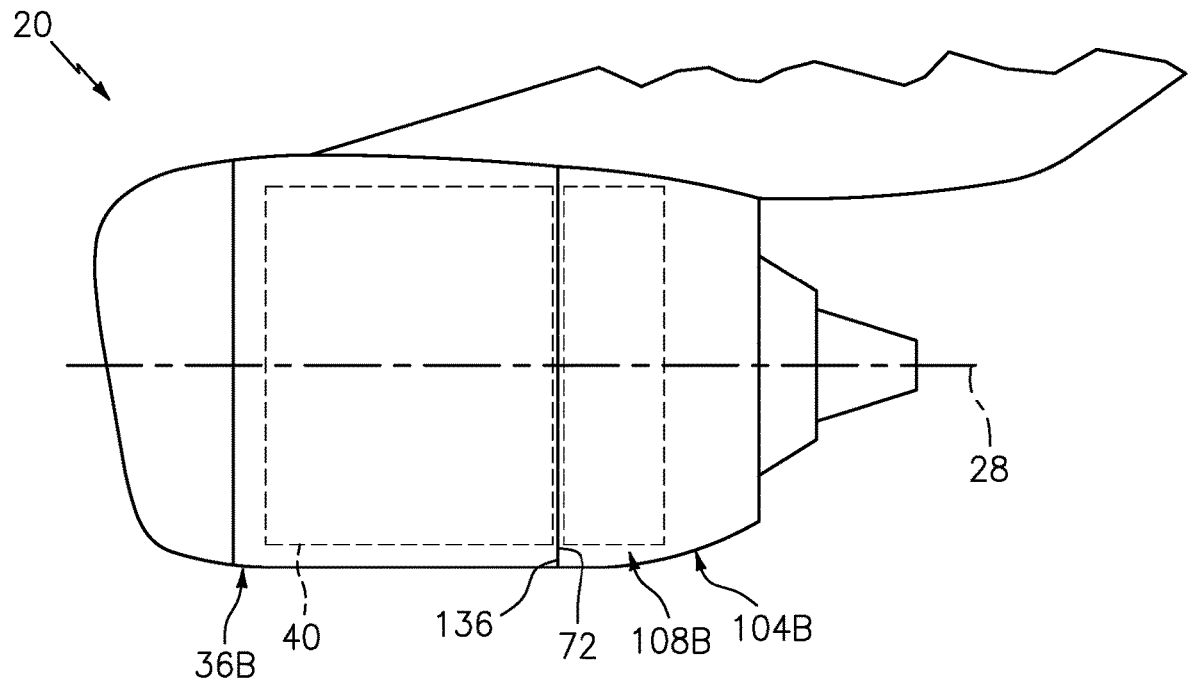
FIG. 9A is an illustration of the second side of the aircraft propulsion system with its translating second thrust reverser sleeve in a closed position.
Figure 9B:
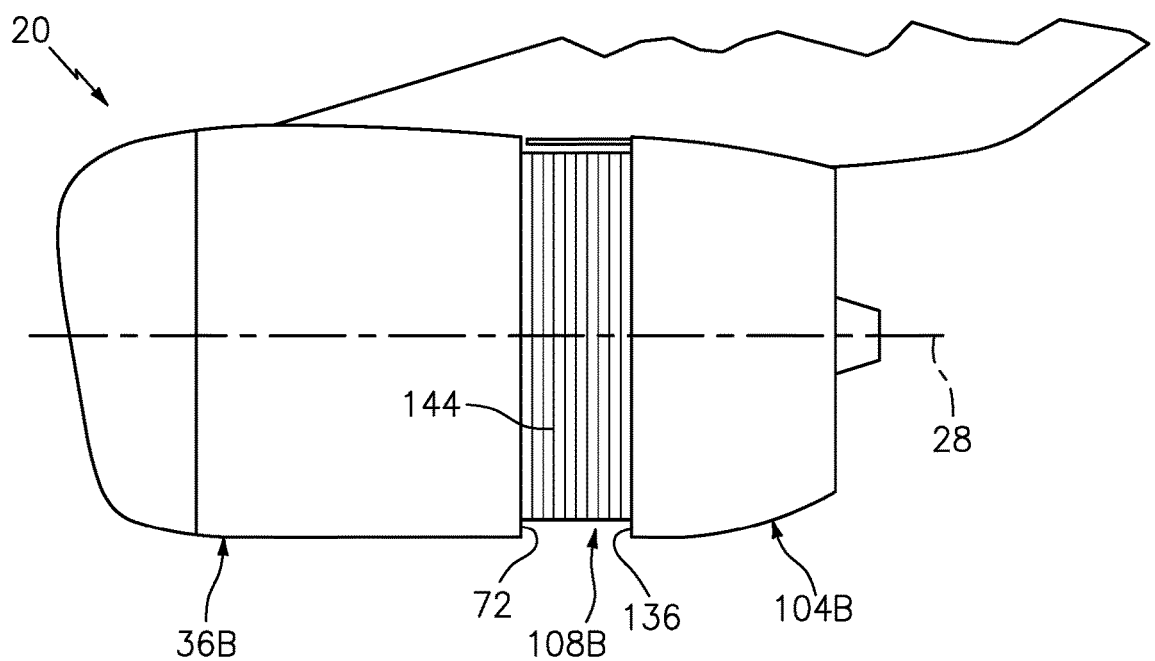
FIG. 9B is an illustration of the second side of the aircraft propulsion system with its translating second thrust reverser sleeve in an open position.

Referring to FIGS. 9A and 9B, the second thrust reverser sleeve 104B is configured to move (e.g., translate) between a second thrust reverser sleeve stowed position (see FIG. 9A) and a second thrust reverser sleeve deployed position (see FIG. 9B). In the second thrust reverser sleeve stowed position of FIG. 9A, the forward edge 136 of the second thrust reverser sleeve 104B is axially abutted with/next to the aft edge 72 of the second fan cowl 36B as described above. In the second thrust reverser deployed position of FIG. 9B, the forward edge 136 of the second thrust reverser sleeve 104B is axially separated/spaced from the aft edge 72 of the second fan cowl 36B by a gap. This enables the second thrust reverser sleeve 104B to uncover the second cascade 108B and a second passage 144 of the thrust reverser. By contrast, in the second thrust reverser sleeve stowed position, the second thrust reverser sleeve 104B covers the second cascade 108B and closes the second passage 144. Referring to FIG. 5, the second blocker doors 106B may also be deployed radially inward into the bypass flow path 134 as the second thrust reverser sleeve 104B moves from its stowed position to its deployed position.

Figure 10:
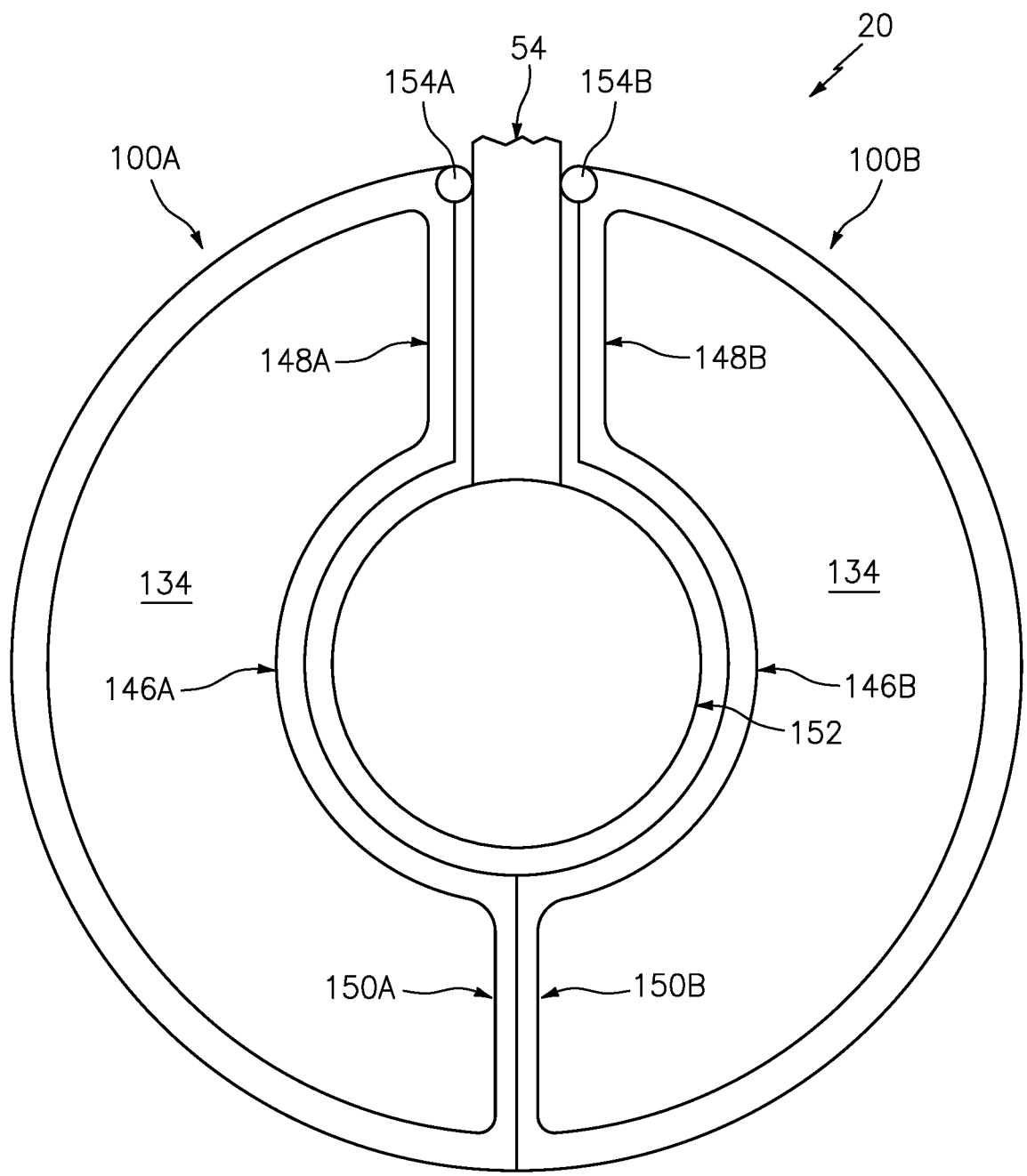
FIG. 10 is a schematic cross-sectional illustration of the aircraft propulsion system with its first and second thrust reverser sections in closed positions.

Referring to FIG. 10, the first thrust reverser section 100A further includes a first core structure 146A (e.g., cowl/barrel) and one or more first bifurcation structures 148A and 150A (e.g., cowls). The first core structure 146A is configured to provide an aerodynamic covering for at least a portion of a first side of a core 152 of the gas turbine engine, which engine core 152 may include a compressor section, a combustor section and a turbine section of the gas turbine engine. The first core structure 146A of FIG. 10, for example, is a generally arcuate (e.g., half barrel) body which extends axially along and circumferentially about the engine core 152.

The first (e.g., upper) bifurcation structure 148A is connected to and extends between a first (e.g., upper) end of the first core structure 146A and the first thrust reverser section outer portion. This first bifurcation structure 148A may be configured to provide an aerodynamic cover for the pylon (see FIGS. 1 and 2). The first (e.g., lower) bifurcation structure 150A is connected to and extends between a second (e.g., lower) end of the first core structure 146A and the first thrust reverser section outer portion. The first thrust reverser section 100A and its components may thereby form a first D-duct (also sometimes referred to as a C-duct), which first D-duct forms a first side section of the bypass flow path 134. The present disclosure, however, is not limited to such an exemplary D-duct configuration. For example, in other embodiments, the bypass flow path 134 may have an O-duct configuration.

Figure 11:
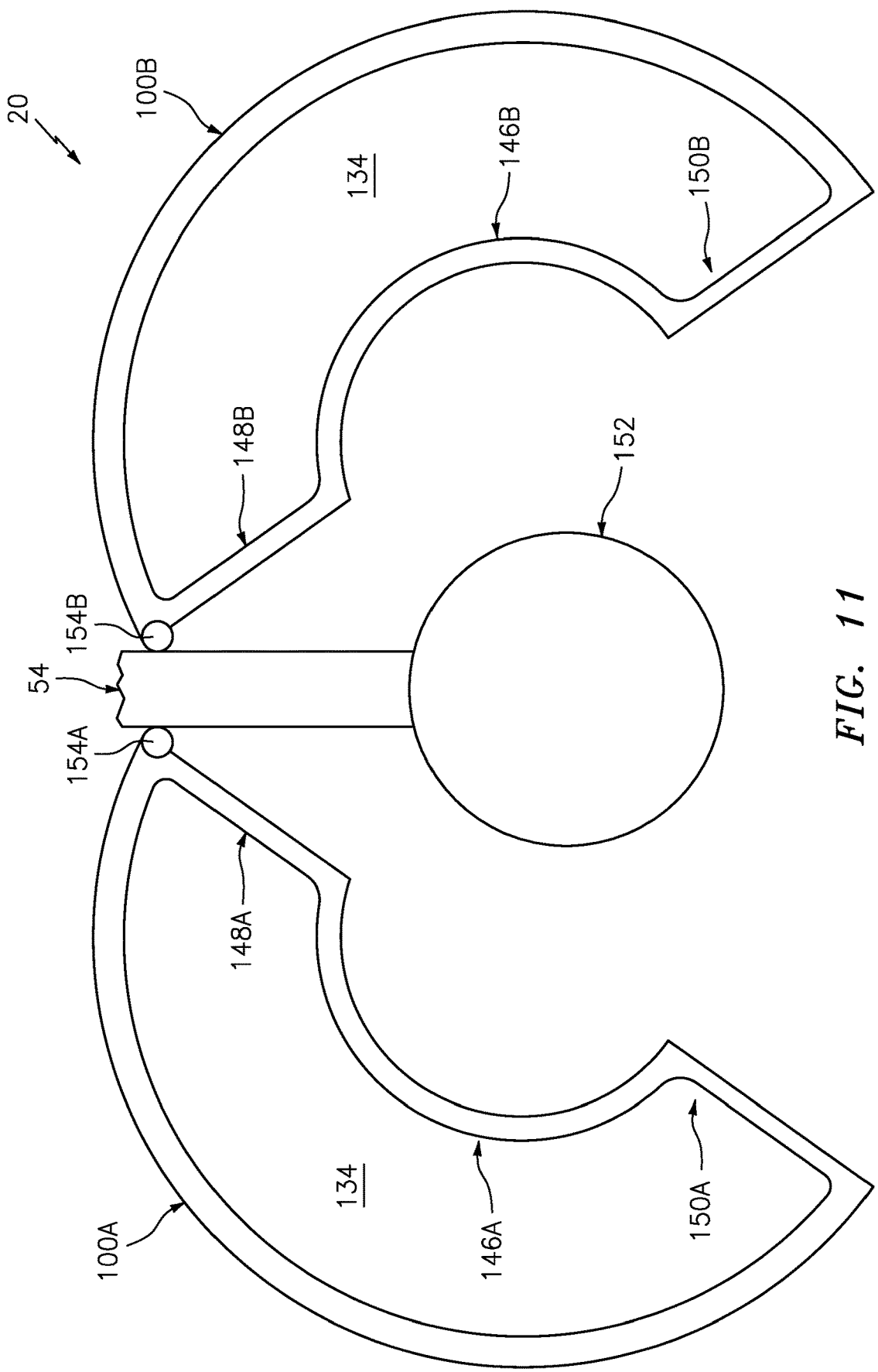
FIG. 11 is a schematic cross-sectional illustration of the aircraft propulsion system with its first and second thrust reverser sections in open positions.

The first thrust reverser section 100A of FIGS. 10 and 11 is configured to move (e.g., pivot) between a first thrust reverser section closed position (see FIG. 10) and a first thrust reverser section open position (see FIG. 11). The first thrust reverser section 100A of FIGS. 10 and 11, for example, is movably (e.g., pivotally) mounted to the fixed structure 54 by one or more hinges 154A (e.g., a hinge beam) or any other moveable attachment. With this configuration, the first thrust reverser section 100A may be opened (e.g., pivoted from the closed position of FIG. 10 to the open position of FIG. 11) to uncover and provide access to the first side of the engine core 152 and/or one or more components mounted to and/or otherwise arranged with the first side of the engine core 152.

Referring to FIG. 10, the second thrust reverser section 100B further includes a second core structure 146B (e.g., cowl/barrel) and one or more second bifurcation structures 148B and 150B (e.g., cowl). The second core structure 146B is configured to provide an aerodynamic covering for at least a portion of a second side of the engine core 152. The second core structure 146B of FIG. 10, for example, is a generally arcuate (e.g., half barrel) body which extends axially along and circumferentially about the engine core 152.

The second (e.g., upper) bifurcation structure 148B is connected to and extends between a first (e.g., upper) end of the second core structure 146B and the second thrust reverser section outer portion. This second bifurcation structure 148B may be configured to provide an aerodynamic cover for the pylon (see FIGS. 1 and 2). The second (e.g., lower) bifurcation structure 150B is connected to and extends between a second (e.g., lower) end of the second core structure 146B and the second thrust reverser section outer portion. The second thrust reverser section 100B and its components may thereby form a second D-duct (also sometimes referred to as a C-duct), which second D-duct forms a second side section of the bypass flow path 134. The present disclosure, however, is not limited to such an exemplary D-duct configuration. For example, in other embodiments, the bypass flow path 134 may have an O-duct configuration.

The second thrust reverser section 100B of FIGS. 10 and 11 is configured to move (e.g., pivot) between a second thrust reverser section closed position (see FIG. 10) and a second thrust reverser section open position (see FIG. 11). The second thrust reverser section 100B of FIGS. 10 and 11, for example, is movably (e.g., pivotally) mounted to the fixed structure 54 by one or more hinges 154B (e.g., a hinge beam) or any other moveable attachment. With this configuration, the second thrust reverser section 100B may be opened (e.g., pivoted from the closed position of FIG. 10 to the open position of FIG. 11) to uncover and provide access to the second side of the engine core and/or one or more components mounted to and/or otherwise arranged with the second side of the engine core 152.

During routine aircraft propulsion system 20 inspection, maintenance and/or repair, access to various components of the aircraft propulsion system 20 may be required. These components may be categorized, for example, as primary components and secondary components. The term "primary component" may described an aircraft propulsion system component that requires (e.g., via prescribed manufacturer and/or government agency (e.g., FAA) guidelines) frequent inspection, maintenance and/or repair. Examples of such primary components may include, but are not limited to, engine mounts, an accessory gearbox, engine lubrication components, thrust reverser components, etc. The term "secondary component" may describe an aircraft propulsion system component that requires (e.g., via prescribed manufacturer and/or government agency (e.g., FAA) guidelines) infrequent inspection, maintenance and/or repair. Examples of such secondary components may include, but are not limited to, engine mounts, safety components such as fire switches, engine monitoring systems, etc.

The primary components may be mounted and/or otherwise configured with the engine core 152 and/or on one side (e.g., the second side) of the fan case 40. The secondary components may be mounted and/or otherwise configured with the other side (e.g., the first side) of the fan case 40 and/or various other areas all about the aircraft propulsion system 20. As a result, during primary component inspection, maintenance and/or replacement, technicians may only need access the engine core 152 and/or the second side of the fan case 40.

Figure 7:
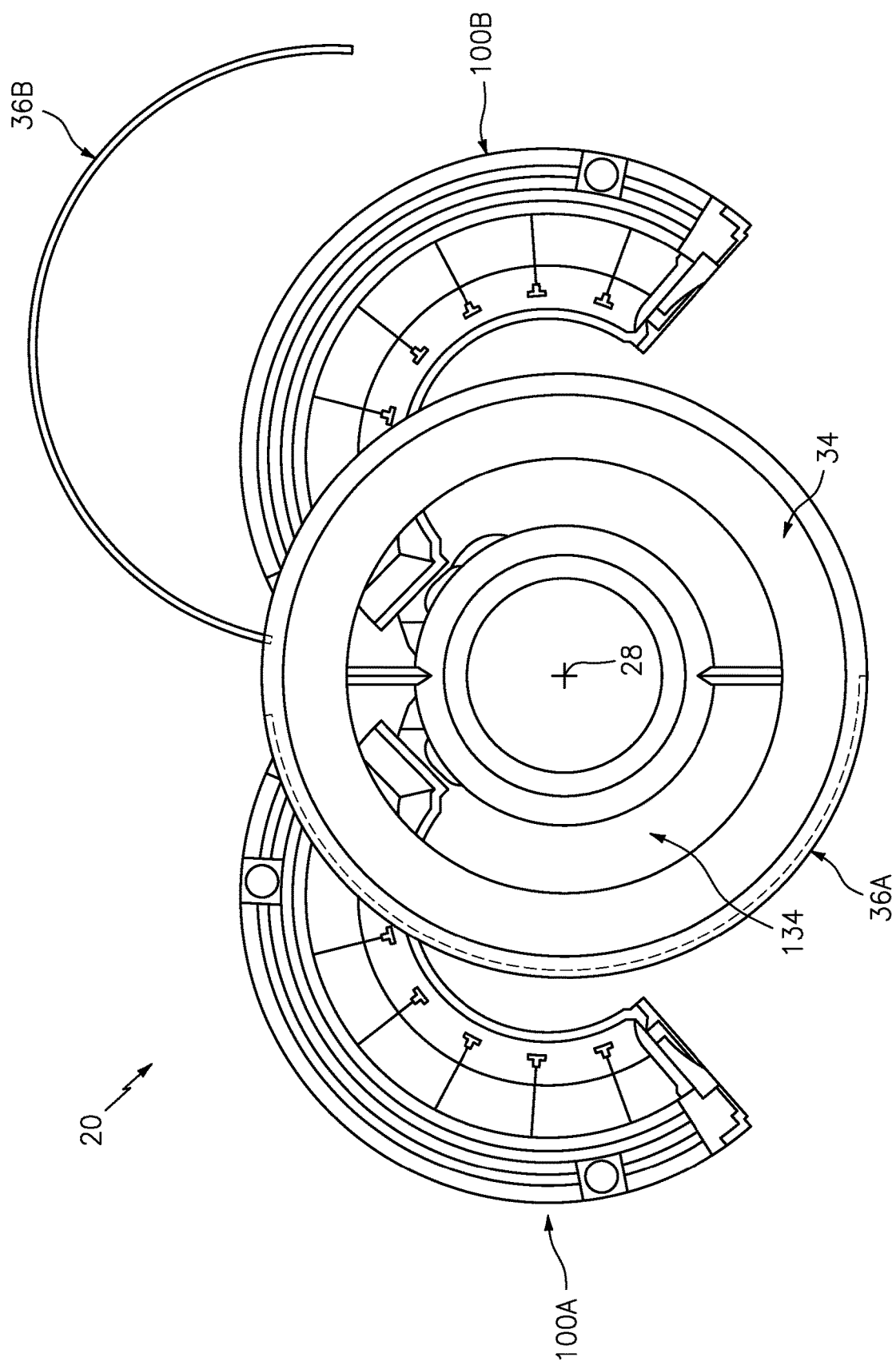
FIG. 7 is an illustration of the aircraft propulsion system with its first fan cowl in a closed position and with its second fan cowl and its first and second thrust reverser sections in open positions.

Referring to FIG. 7, in an effort to reduce nacelle 22 costs, weight and/or complexity, the nacelle 22 of the present disclosure is configured to enable opening of the first thrust reverser section 100A without opening of the first fan cowl 36A. In other words, the first fan cowl 36A may remain in its closed position even when the first thrust reverser section 100A is moved from its closed position (see FIG. 10) to its open position (see FIGS. 7 and 11). The first fan cowl 36A thereby does not need to be configured to withstand and/or facilitate frequent opening. For example, the first fan cowl 36A may be configured without a power door opening system (PDOS). The first fan cowl 36A may be configured without hold-open rod(s) for holding that cowl in an open position. The first fan cowl 36A may be configured without a centering device with any of its attachments 56 (see FIG. 1). The first attachments 56 may have light weight, low profile and/or simple configurations that would normally not be suited for use with a fan cowl that is routinely opened. The first fan cowl 36A may be configured with fewer structural supports (e.g., stiffeners, reinforcements, etc.) that are ordinary used to support an opened fan cowl during, for example, windy conditions.

The first fan cowl 36A may remain closed when the first thrust reverser section 100A is opened since, for example, the first fan cowl 36A does not axially overlap the second thrust reverser section 100B as shown in FIG. 4. By contrast, the second fan cowl 36B of FIG. 5 does axially overlap the second land 88 which is part of the second thrust reverser section 100B. Thus, in order to open the second thrust reverser section 100B, the second fan cowl 36B is first moved to its open position; e.g., see FIG. 7.

In some embodiments, referring to FIG. 1, the first fan cowl 36A may be configured with one or more flow surface interruptions. The first fan cowl 36A of FIG. 1, for example, is configured with an access port 156 and a vent 158. The access port 156 may be configured with a removable panel 160, which panel 160 provides access to at least one component attached to the fan case 40 when removed. This component may be, for example, an oil tank.

In some embodiments, referring to FIG. 2, the second fan cowl 36B may be configured with a substantially (or completely) uninterrupted exterior surface 162; e.g., flow surface. The second fan cowl 36B, for example, may be configured without any ports, vents, or other such features which would provide a significant flow surface interruption. That said, the second fan cowl 36B may include exposed fasteners (e.g., rivet heads) which may produce relatively small disruptions to laminar flow against the second fan cowl 36B.

Figure 12:
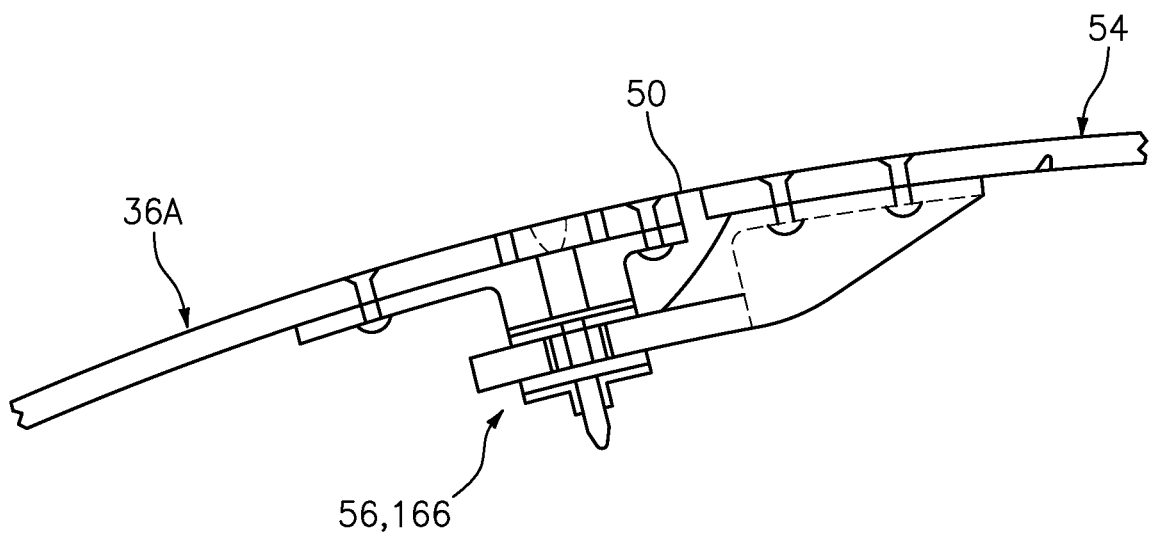
FIG. 12 is an illustration of a first attachment between the first fan cowl and a fixed structure.
Figure 13:
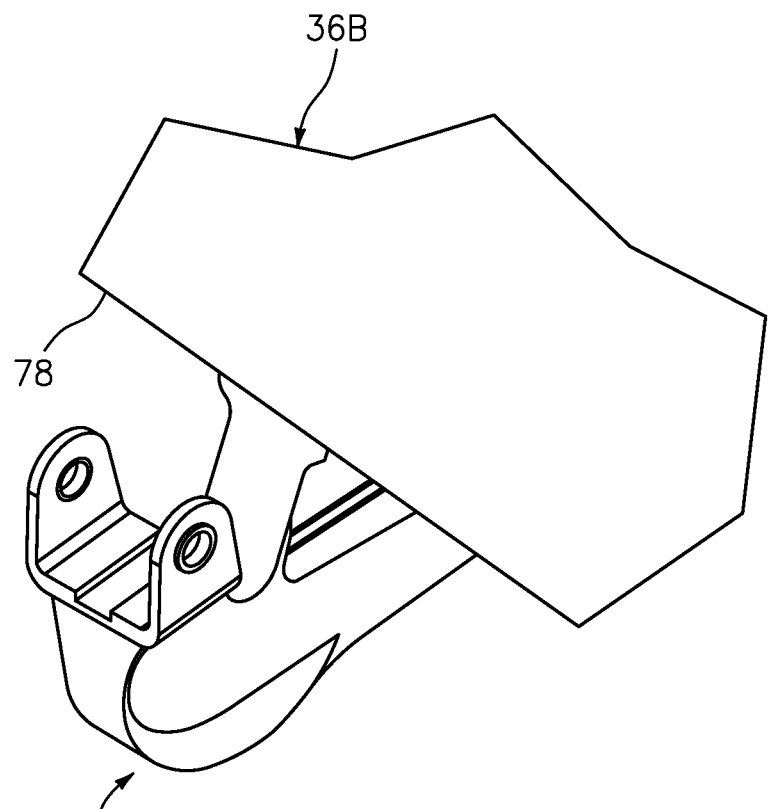
FIG. 13 is a perspective illustration of a second attachment mounted to the second fan cowl.

Referring to FIG. 12, one or more or each first attachment 56 has a first attachment (e.g., hinge) configuration; e.g., a low profile hinge configuration, a hook style hinge configuration, low profile removable pivotable attachment configuration, etc. Referring to FIG. 13, one or more or each second attachment 82 has a second attachment (e.g. hinge) configuration; e.g., a goose neck hinge configuration. The first attachment configuration may be different than the second attachment configuration to, for example, reduce the weight, cost and/or profile of the first fan cowl 36A relative to the second fan cowl 36B. For example, the second attachment 82 of FIG. 13 is configured as a gooseneck hinge 164 whereas the first attachment 56 of FIG. 12 is configured as a low profile removable attachment 166. Whereas the second attachment 82 of FIG. 13 is configured to maintain the second fan cowl 36B pivotally attached to the fixed structure 54, the first attachment 56 of FIG. 12 enable the first fan cowl 36A to be completely removed from the nacelle 22 when the first fan cowl 36A is moved to its open position.

Figure 14:
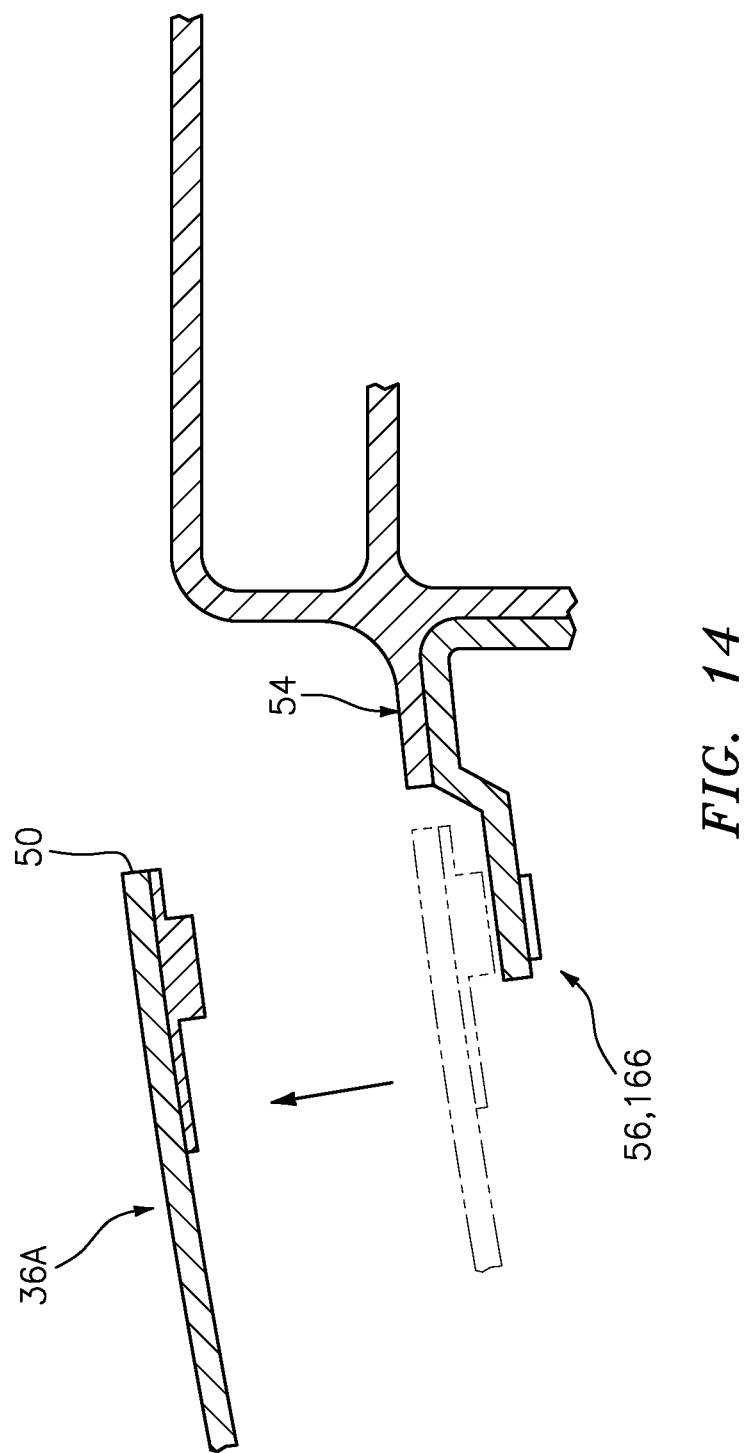
FIG. 14 illustrates a sequence of a first fan cowl being removed from a fixed structure.

In some embodiments, referring to FIG. 14, the first fan cowl 36A may be moved from the first fan cowl closed position to the first fan cowl open (e.g., removed) position without pivoting. Each first attachment 56 of FIGS. 12 and 14, for example, is configured as a bolt-on attachment where the first fan cowl 36A may be lifted straight off from the nacelle 22 when a respective bolt (or bolts) of the first attachments 56 is (are) removed.

Figure 15:
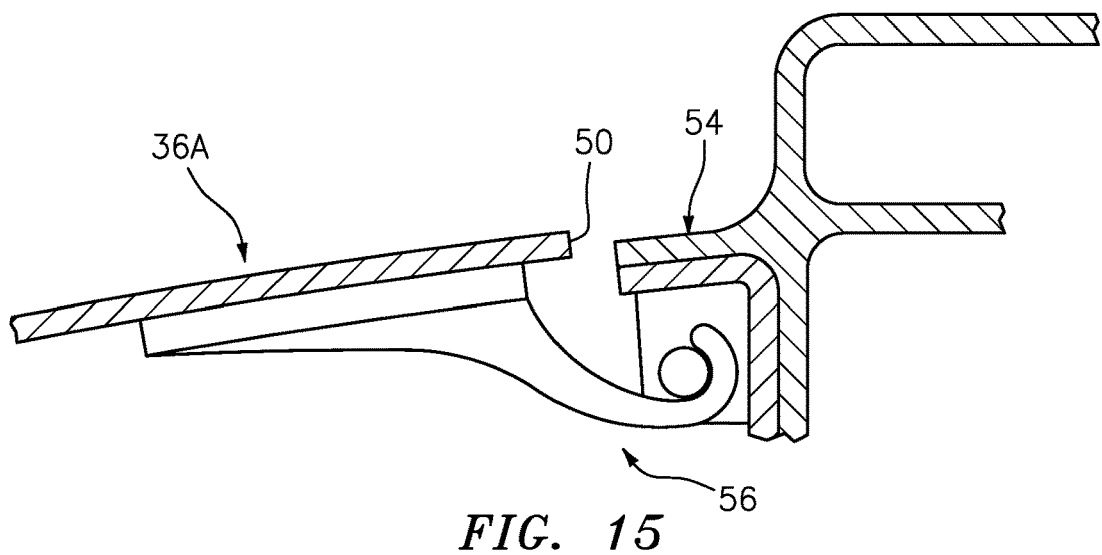
FIGS. 15-17 illustrate another sequence of a first fan cowl being removed from a fixed structure.
Figure 16:
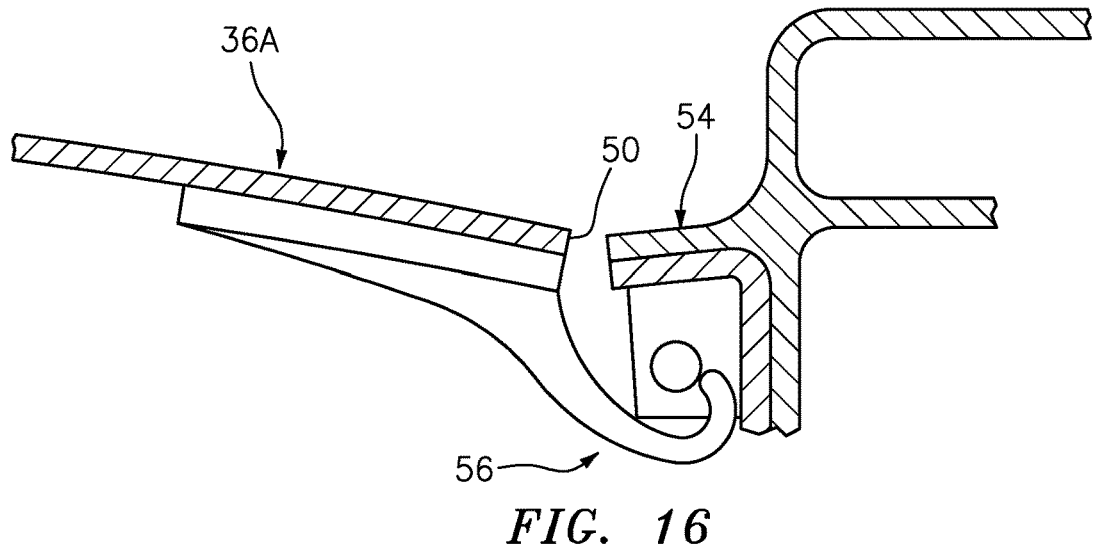
Figure 17:
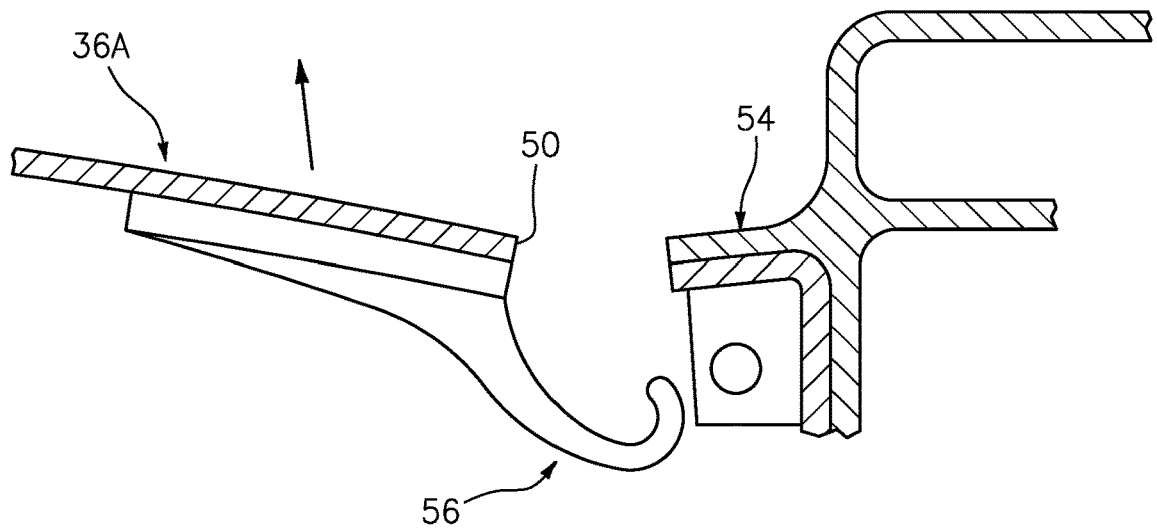

In some embodiments, referring to FIGS. 15-17, the first fan cowl 36A may be pivoted and then otherwise moved (e.g., translated and/or lifted) from the first fan cowl closed position to the first fan cowl open (e.g., removed) position. Each first attachment 56 of FIGS. 15-17, for example, is configured as a hook attachment. With this type of hook attachment, the first fan cowl 36 may be pivoted away from the first fan cowl closed position (see FIG. 15) such that a hook disengages a respective pin, and then the first fan cowl 36 may be translated/lifted away from the nacelle 22 to the first fan cowl open position (see FIG. 17).

In some embodiments, each of the fan cowls 36A and 36B may include one or more locators. These locators are configured, for example, to axially locate the fan cowls 36A and 36B when in their closed positions.

In some embodiments, the second fan cowl 36B may be configured with a power door opening system (PDOS). The second fan cowl 36B may also or alternatively be configured with one or more hold open devices (e.g., rods).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
    a fixed structure;
    a fan case comprising a first groove; and
    a nacelle covering the fan case, the nacelle including a first fan cowl and a first thrust reverser section adjacent the first fan cowl;
    the first fan cowl movably attached to and arranged on a first side of the fixed structure, the first fan cowl configured to move between a first fan cowl closed position and a first fan cowl second position, and the first fan cowl spaced axially forward from the first groove;
    the first thrust reverser section movably attached to and arranged on the first side of the fixed structure, the first thrust reverser section configured to move between a first thrust reverser section closed position and a first thrust reverser section open position when the first fan cowl is in the first fan cowl closed position, and the first thrust reverser section comprising a first protrusion that projects radially into the first groove when the first thrust reverser section is in the first thrust reverser section closed position;
    the nacelle further including a second fan cowl and a second thrust reverser section;
    the second fan cowl movably attached to and arranged on a second side of the fixed structure, and the second fan cowl configured to move between a second fan cowl closed position and a second fan cowl open position;
    the second thrust reverser section movably attached to and arranged on the second side of the fixed structure, and the second thrust reverser section configured to move between a second thrust reverser section closed position and a second thrust reverser section open position when the second fan cowl is in the second fan cowl open position;
    the first fan cowl extending circumferentially from a first fan cowl first edge adjacent the fixed structure to a first fan cowl second edge, and the first fan cowl having a first axial length at the first fan cowl second edge; and
    the second fan cowl extending circumferentially from a second fan cowl first edge adjacent the fixed structure to a second fan cowl second edge adjacent the first fan cowl second edge, and the second fan cowl having a second axial length at the second fan cowl second edge;
    wherein the first axial length is less than the second axial length.

2. The assembly of claim 1, wherein the first thrust reverser section is configured to pivot outward from the first thrust reverser section closed position to the first thrust reverser section open position when the first fan cowl is in the first fan cowl closed position.

3. The assembly of claim 1, wherein
the first thrust reverser section comprises a fairing and a first thrust reverser sleeve;
the fairing is located axially between and circumferentially aligned with the first fan cowl and the first thrust reverser sleeve; and
the first fan cowl, the fairing and the first thrust reverser sleeve each form a respective portion of an exterior flow surface of the nacelle.

4. The assembly of claim 3, wherein the first thrust reverser sleeve is configured to translate axially from a stowed position to a deployed position to open a thrust reverser passage axially between the first thrust reverser sleeve and the fairing.

5. The assembly of claim 3, further comprising:
a bulkhead comprising a land;
the first fan cowl axially overlapping and radially abutted against the land when the first fan cowl is in the first fan cowl closed position; and
the fairing axially overlapping and radially abutted against the land when the first thrust reverser section is in the first thrust reverser section closed position.

6. The assembly of claim 1, wherein the second fan cowl axially overlaps the first thrust reverser section.

7. The assembly of claim 1, further comprising a latch configured to secure the first fan cowl and the second fan cowl together when the first fan cowl is in the first fan cowl closed position and when the second fan cowl is in the second fan cowl closed position.

8. The assembly of claim 1, further comprising:
a first attachment with a first attachment configuration, the first attachment moveably attaching the first fan cowl to the fixed structure; and
a second attachment with a second attachment configuration that is different than the first attachment configuration, the second attachment pivotally attaching the second fan cowl to the fixed structure.

9. The assembly of claim 1, wherein the second thrust reverser section includes a second thrust reverser sleeve that is arranged axially adjacent the second fan cowl.

10. The assembly of claim 1, wherein the second fan cowl is configured with a substantially uninterrupted exterior surface.

11. The assembly of claim 1, wherein the first fan cowl is configured with at least one of an access port or a vent.

12. The assembly of claim 1, wherein
the fan case further comprises a second groove;
the second fan cowl axially overlaps the second groove; and
the second thrust reverser section comprises a second protrusion that projects radially into the second groove when the second thrust reverser section is in the second thrust reverser section closed position.

13. An assembly for an aircraft propulsion system, comprising:
a fixed structure;
a fan case comprising a first groove; and
a nacelle covering the fan case, the nacelle including a first fan cowl and a first thrust reverser section adjacent the first fan cowl;
the first fan cowl movably attached to and arranged on a first side of the fixed structure, the first fan cowl configured to move between a first fan cowl closed position and a first fan cowl second position, and the first fan cowl spaced axially forward from the first groove;
the first thrust reverser section movably attached to and arranged on the first side of the fixed structure, the first thrust reverser section configured to move between a first thrust reverser section closed position and a first thrust reverser section open position when the first fan cowl is in the first fan cowl closed position, and the first thrust reverser section comprising a first protrusion that projects radially into the first groove when the first thrust reverser section is in the first thrust reverser section closed position;
the nacelle further including a second fan cowl and a second thrust reverser section;
the second fan cowl movably attached to and arranged on a second side of the fixed structure, and the second fan cowl configured to move between a second fan cowl closed position and a second fan cowl open position;
the second thrust reverser section movably attached to and arranged on the second side of the fixed structure, and the second thrust reverser section configured to move between a second thrust reverser section closed position and a second thrust reverser section open position when the second fan cowl is in the second fan cowl open position; and
the second fan cowl configured to prevent the second thrust reverser section from being moved to the second thrust reverser section open position when the second fan cowl is in the second fan cowl closed position.

14. An assembly for an aircraft propulsion system, comprising:
a fixed structure;
a first fan cowl movably attached to and arranged on a first side of the fixed structure, the first fan cowl configured to move between a first fan cowl closed position and a first fan cowl second position, the first fan cowl extending circumferentially between a first fan cowl first edge adjacent the fixed structure and a first fan cowl second edge, and the first fan cowl having a first axial length at the first fan cowl second edge;
a second fan cowl movably attached to and arranged on a second side of the fixed structure, the second fan cowl configured to move between a second fan cowl closed position and a second fan cowl open position, the second fan cowl extending circumferentially between a second fan cowl first edge adjacent the fixed structure and a second fan cowl second edge adjacent the first fan cowl second edge, and the second fan cowl having a second axial length at the second fan cowl second edge, wherein the second axial length is different than the first axial length;
a translating first thrust reverser sleeve;
a fixed fairing axially between the first fan cowl and the translating first thrust reverser sleeve; and
a translating second thrust reverser sleeve axially adjacent the second fan cowl.

* * * * *